(12) United States Patent
Burgaleta Salinas et al.

(10) Patent No.: US 6,469,998 B1
(45) Date of Patent: Oct. 22, 2002

(54) METHOD AND APPARATUS FOR COMMUNICATING DATA PACKETS FROM AN EXTERNAL PACKET NETWORK TO A MOBILE RADIO STATION

(75) Inventors: Alberto Burgaleta Salinas, Alcorcón; Miguel Cobo Esteban, Madrid, both of (ES); Thorsten Herber, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/166,778

(22) Filed: Oct. 6, 1998

(51) Int. Cl.$^7$ .................................................. H04J 3/16
(52) U.S. Cl. ...................................... 370/338; 370/468
(58) Field of Search ................................. 370/351, 352, 370/389, 395, 401, 400, 402, 403, 480, 465, 338, 341, 349, 428, 468, 337, 347, 346, 345, 350; 455/422, 450, 452, 453, 428, 560, 554

(56) References Cited

U.S. PATENT DOCUMENTS 5,159,592 A    10/1992   Perkins
5,708,655 A    1/1998    Toth et al.

FOREIGN PATENT DOCUMENTS

WO    WO 97/21313    6/1997
WO    WO 97/48246    12/1997
WO    WO 99/21379    4/1999

OTHER PUBLICATIONS

"Dynamic Host Configuration Protocol", R. Droms, Oct. 1993, pp. 1–34.*
C. Perkins, Oct. 1996, "IP Mobility Support", pp. 1–79.*

* cited by examiner

*Primary Examiner*—Dang Ton
(74) *Attorney, Agent, or Firm*—Nixon & Vanderhye, P.C.

(57) ABSTRACT

Packet data are efficiently communicated from a packet data network to a mobile subscriber by way of a mobile communications network. When the mobile communications network receives a message from the packet data network intended for the mobile subscriber, an available mobile communications network packet address is dynamically assigned from a pool of packet addresses to the mobile subscriber. Thereafter, packets included in the data message are routed to the mobile subscriber using that dynamically-allocated address. When the address is no longer needed, it is returned to the pool. Each packet address in the pool includes a corresponding indication that designates whether that address is allocated or available for allocation. A correspondence is established between a name associated with the mobile subscriber (e.g., an Internet domain name), and a mobile subscriber identifier (e.g., an IMSI). A dynamically-assigned packet address is associated with the corresponding mobile subscriber name and identifier. Thereafter, packet data from the packet data network that include the mobile station name are directed to the mobile subscriber using the corresponding mobile subscriber identifier and the associated, dynamically-allocated packet address.

32 Claims, 10 Drawing Sheets

Fig. 5

| Static Relationship | | Static or non-static relationship |
|---|---|---|
| Destination name | IMSI | PDP Address allocated |
| name 1 | IMSI 1 | PDP address 1 |
| name 2 | IMSI 1 | PDP address 2 |
| name 3 | IMSI 2 | PDP address 3 |
| name 4 | IMSI 3 | PDP address 4 |
| name 5 | IMSI 2 | PDP address 5 |
| ... | ... | ... |
| name n | IMSI n | PDP address n |
| ... | ... | ... |

Fig. 6

| Dynamic PDP address | Allocation indication |
|---|---|
| dynamic PDP address 1 | allocated |
| dynamic PDP address 2 | allocated |
| dynamic PDP address 3 | idle |
| dynamic PDP address 4 | allocated |
| ... | ... |
| dynamic PDP address n | idle |
| ... | ... |

METHOD AND APPARATUS FOR COMMUNICATING DATA PACKETS FROM AN EXTERNAL PACKET NETWORK TO A MOBILE RADIO STATION

FIELD OF THE INVENTION

The present invention relates to packet communications in a mobile communications network, and more particularly, to dynamically providing packet addresses to mobile stations so that packets received from an external packet network can be routed to that mobile station.

BACKGROUND AND SUMMARY OF THE INVENTION

The main application of most mobile radio systems like the Global System for Mobile communications (GSM) has been mobile telephony which typically only supports circuit-switched communications where guaranteed, "fixed" circuits are dedicated to a user for the duration of a call. However, packet-switched applications, like facsimile transmission and short message exchange, are becoming popular in mobile networks. Example data applications include wireless personal computers, mobile offices, electronic funds transfer, road transport telemetry, field service businesses, fleet management, etc. These data applications are characterized by "bursty" traffic where a relatively large amount of data is transmitted over a relatively short time interval followed by significant time intervals when little or no data is transmitted.

While bursty traffic can be transmit using a circuit-switched channel, such a transmission underutilizes that channel because there are likely large intervals between bursts when the channel is reserved but is not being used, there is no information to be transmit from or received by the user. From an efficiency view point, this is a waste of transmission resources which are particularly limited for radio communications. However, from a customer service view point, because a circuit-switched channel is not shared with other users, the user is essentially guaranteed a certain quality of service. In addition to inefficiency, it takes a relatively long time to set up and take down a circuit-switched call compared with individual packet routing in packet-switched sessions. In bursty traffic situations, packet-switched bearers better utilize the transmission bandwidth because a communications resource is used only when there is data to transmit. Communication channels are therefore typically shared by many users. Another advantage is that in contrast to time-oriented charging applied for circuit-switched connections, packet-switched data services allow charging depending on the amount of data actually transmitted and on the quality of service of that transmission.

In order to provide such mobile data applications, packet radio network services accommodate connectionless, packet-switched data services with high bandwidth efficiency. One example is the General Packet Radio Service (GPRS) incorporated into the existing circuit-switched GSM network. Another is the Cellular Digital Packet Data (CDPD) network used into the existing D-AMPS network. A significant interest of end users of a mobile packet data service such as GPRS is that wireless PCs support conventional Internet-based applications like file transfer, submission and reception of e-mail, and "surfing" the Internet via the worldwide web. Conferencing and playback applications, including video and multimedia, are also important services to be supported by mobile networks.

Although circuit-switched services are well known in mobile networks, mobile packet-switched services are quite new. Therefore, a brief description of the latter using GSM/GPRS as an example is now provided.

FIG. 1 shows a mobile data service from a user's point of view in the context of a mobile communications system 10. An end user communicates data packets using a mobile host 12 including for example a laptop computer 14 connected to a mobile terminal 16. The mobile host 12 communicates for example with a fixed computer terminal 18 incorporated in a local area network (LAN) 20 through a mobile packet data support node 22 via one or more routers 24, a packet data network 26, and a router 28 in the local area network 20. Of course, those skilled in the art will appreciate that this drawing is simplified in that the "path" is a logical path rather than an actual physical path or connection. In a connectionless data packet communication between the mobile host 12 and fixed terminal 18, packets are routed from the source to the destination independently and do not necessarily follow the same path (although they can).

Thus, independent packet routing and transfer within the mobile network is supported by a mobile packet data support node 22 which acts as a logical interface or gateway to external packet networks. A subscriber may send and receive data in an end-to-end packet transfer mode without using any circuit-switched mode network resources. Moreover, multiple point-to-point, parallel applications are possible. For example, a mobile host like a mobile PC might run at the same time a video conference application, an e-mail application, a facsimile application, a web browsing application, etc. The video conference application would typically require more than one data stream (hereafter referred to as an application flow).

FIG. 2 shows a more detailed mobile communications system using the example GSM mobile communications model that supports both circuit-switched and packet-switched communications and includes a circuit-switched network 35 and a packet-switched network 51. A mobile host 12 including a computer terminal 14 and mobile station 16 communicates over a radio interface with one or more base stations (BSs) 32. Each base station 32 is located in a corresponding cell 30. Multiple base stations 32 are connected to a base station controller (BSC) 34 which manages the allocation and deallocation of radio resources and controls handovers of mobile stations from one base station to another. A base station controller and its associated base stations are sometimes referred to as a base station subsystem (BSS). The BSC 34 is connected to a mobile-services switching center (MSC) 36 in the GSM circuit-switched network 35 through which circuit-switched connections are set up with other networks 38 such as the Public Switched Telephone Network (PSTN), Integrated Services Digital Network (ISDN), etc.

The MSC 36 is also connected via a Signaling System Number 7 (SS7) network 40 to a Home Location Register (HLR) 42, a Visitor Location Register (VLR) 44, and Authentication Center (AUC) 46. The VLR 44 includes a database containing the information about all mobile stations currently located in a corresponding location or service area as well as temporary subscriber information needed by the MSC to provide services to mobiles in its service area. Typically, when a mobile station enters a visiting network or service area, the corresponding VLR 44 requests and receives data about the roaming mobile station from the mobile's HLR and stores it. As a result, when the visiting mobile station is involved in a call, the VLR 44 already has the information needed for call setup.

The HLR 42 is a database node that stores and manages subscriptions. For each "home" mobile subscriber, the HLR contains permanent subscriber data such as the mobile station ISDN number (MSISDN) which uniquely identifies the mobile telephone subscription in the PLMN numbering plan and an international mobile subscriber identity (IMSI) which is a unique identity allocated to each subscriber and used for signaling in the mobile networks. All network-related subscriber information is connected to the IMSI. The HLR 42 also contains a list of services which a mobile subscriber is authorized to use along with a current subscriber location number corresponding to the address of the VLR currently serving the mobile subscriber.

Each BSC 34 also connects to the GSM packet-switched network corresponding to GPRS network 51 at a Serving GPRS Support Node (SGSN) 50 responsible for delivery of packets to the mobile stations within its service area. The gateway GPRS support node (GGSN) 54 acts as a logical interface to external packet data networks 56 such as the IP data network such as the IP data network 56. SGSN nodes 50 and GGSN nodes 54 are connected by an intra-PLMN IP backbone 52. Thus, between the SGSN 50 and the GGSN 54, the Internet protocol (IP) is used as the backbone to transfer data packets. A Subscriber/Service management system 60 is connected to the GGSN 54 and the HLR 42 to update mobile subscriber information and packet address information. The GGSN 54 is also coupled to the HLR 42 to update subscriber database information including assigned packet addresses.

Within the GPRS network 51, packets or protocol data units (PDUs) are encapsulated at an originating GPRS support node and decapsulated at the destination GPRS support node. This encapsulation/decapsulation at the IP level between the SGSN 50 and the GGSN 54 is called "tunneling" in GPRS. The GGSN 54 maintains routing information used to "tunnel" PDUs to the SGSN 50 currently serving the mobile station. A common GPRS Tunnel Protocol (GTP) enables different underlying packet data protocols to be used. All GPRS user-related data needed by the SGSN to perform routing and data transfer functions is accessed from the HLR 42 via the SS7 network 40. The HLR 42 stores routing information and maps the IMSI to one or more packet data protocol (PDP) addresses as well as mapping each PDP address to one or more GGSNs.

Before a mobile host can send packet data to an external network like an Internet service provider (ISP) 58 shown in FIG. 2, the mobile host 12 has to (1) "attach" to the GPRS network 51 to make its presence known and (2) create a packet data protocol (PDP) context to establish a relationship with a GGSN 54 towards the external network that the mobile host is accessing. The attach procedure is carried out between the mobile host 12 and the SGSN 50 to establish a logical link. As a result, a temporary logical link identity is assigned to the mobile host 12. A PDP context is established between the mobile host and the GGSN 54. The selection of a GGSN 54 is based on the name of the external network to be reached.

One or more application flows (sometimes called "routing contexts") may be established for a single PDP context through negotiations with the GGSN 54. An application flow corresponds to a stream of data packets distinguishable as being associated with a particular host application. An example application flow is an electronic mail message from the mobile host to a fixed terminal. Another example application flow is a downloaded graphics file from a web site. Both of these application flows are associated with the same mobile host and the same PDP context.

In order to communicate a packet of data to a wireless communications station requires that the packet be addressed with an identification address of the mobile station. An Internet Protocol (IP) address is an example of such an identification address which can be used to address packets of data which are to be routed to the communications station. An IP address is used when transmissions are made pursuant to an Internet protocol. Analogous addresses are used when data is to be transmitted pursuant to other protocols such as the X.25 protocol.

Typically, packet data transmissions to a mobile station occur only seldomly and during only short intervals. For instance, messaging services typically utilize storage units which store the message and information prior to communication of such information to the mobile station. The mobile station need not be reachable at a particular time for the messaging information to be communicated to the mobile station. The message originator need only be cognizant of the message address, e.g., the mail address, of the mobile station. Once stored at the message storage unit, the mobile station may retrieve anytime thereafter the messages from the storage unit.

This and most other data packet services do not require that a mobile station be identified with a permanent packet address. Commonly-assigned U.S. Pat. No. 5,708,655 to Toth et al. describes in the GSM/GPRS network providing a temporary packet address, e.g., an IP address, after a mobile station has successfully attached to the GPRS network. After successful attachment, a temporary packet address is assigned to a mobile station so that it can send packets—sometimes referred to as "mobile-originated" packets—to another communications node. Of course, mobile-originated packets may originate from a terminal coupled to the mobile station. However, the Toth patent does not address the problem of routing the packets to a mobile station when the mobile data network receives "mobile-terminating" packets for a GSM/GPRS mobile subscriber. Again, "mobile-terminating packets may terminate at the mobile station or at a terminal device coupled to the mobile station. Specifically, the Toth patent does not make a provision for assigning a dynamic packet address when receiving terminating packets for a mobile subscriber.

Recent proposals to the GSM/GPRS specification offer a static addressing scheme for handling mobile-terminating packets in the GSM/GPRS systems. Static addressing is undesirable because there is only a finite number of packet type addresses that can be administered and allocated by a mobile communications network. Consequently, system capacity is limited by the number of static addresses. Static addressing is also inefficient. Many if not most of statically-assigned addresses to mobile subscribers would not be utilized much of the time.

Another obstacle with data packet communications in mobile communications networks is that no mechanism is in place for routing mobile-terminating packets based on the mobile subscriber's "domain name." Unlike an IP address, such as a 32-bit integer used to identify a particular machine, users prefer to assign machines pronounceable, easily-remembered names. A domain name system provides a scheme for assigning meaningful, high-level names to a large set of machines and provides a mechanism for mapping between high-level machine names and IP addresses including translation from high-level names to IP addresses and translation from IP addresses to high-level machine names. Typically, a domain name may consist of a sequence of subnames separated by a delimiter character the period. Individual sections of the name might represent sites or groups but the domain system simply refers to each section as a label. An example of such a domain name is an Internet e-mail address such as xxx@ericsson.se. In addition to the rules for name syntax, the domain name scheme includes a distributed system for mapping names to addresses. The mechanism for mapping names to addresses consists of independent, cooperative name servers that supply name-to-address translation mapping from domain names to IP addresses. To perform domain name resolution, the "client" sends a domain name query that contains the name to be resolved to a name server for resolution. When the domain name server receives the query, it checks to see if the name lies in the subdomain for which it is an authority. If so, it translates the name to an address according to its database and appends an answer to the query before sending it back to the client.

The problem with such a domain name query system in a mobile data communications environment is that to implement dynamic addressing, the mobile data communication network should be able to associate this dynamic IP address to the proper mobile subscriber identified in the mobile network via the IMSI or MSISDN. Today, no such association or a mechanism to make such an association are defined or provided.

It is an object of the present invention to overcome the above-described obstacles by providing a method and apparatus for efficiently routing terminating data packets to a specific mobile subscriber.

It is another object of the present invention to dynamically allocate temporary packet addresses to mobile stations so that they can receive packets.

It is another object of the present invention to route terminating packets to a mobile subscriber based on that subscriber's Internet destination or domain name.

It is an object of the present invention to provide a pool of packet addresses in a mobile communications network that can be shared and efficiently allocated to many mobile subscribers.

These and other objects are achieved by the present invention which provides a method for efficiently communicating packet data from a packet data network to a mobile station by way of a mobile communications network. The present invention seeks to efficiently pool mobile-terminating packet addresses, dynamically allocate them on an as-needed basis, and return those temporary addresses to the pool when they are no longer needed. When the mobile communications network receives a message from the packet data network intended for the mobile station, an available mobile communications network packet address is dynamically assigned from the pool of packet addresses to the mobile station. Thereafter, packets included in the data message are routed to the mobile station using that dynamically-assigned packet address. When the address is no longer needed, it is returned to the pool. Each packet address in the pool includes a corresponding indication that designates whether that address is allocated or available for allocation.

In a preferred example embodiment, a correspondence is established between a subscriber identification name or alias (e.g., Internet or domain name) associated with the mobile subscriber and a mobile subscriber identifier. Preferably, the mobile identifier is an international mobile subscriber identifier (IMSI). In addition, a dynamically-assigned packet address is associated with the corresponding mobile subscriber name and identifier. Thereafter, packets from the packet data network associated with the dynamic IP address allocated for this data communication are directed to the mobile subscriber using the corresponding assigned packet address.

The mobile communications network includes a gateway service node that is associated with a mobile station as well as with an external packet data network. The mobile communications network includes a mobile packet-switched network, coupled to the radio base station, that includes a domain name system server associated with the gateway service node. In one embodiment, the domain name system server may be located in the gateway node, and in another embodiment, the domain name system server is coupled to but located outside of the gateway node. The domain name system server receives a domain name service query from the external packet data network that includes a domain name corresponding to the mobile subscriber. A dynamic packet address controller receives a request for a packet address from the domain name system server, assigns a temporary packet address to the mobile subscriber, and provides that temporary packet address to the domain name system server. In a preferred embodiment, the dynamic packet address controller is located in the gateway node. The domain name system server then returns the temporary address to the external packet network in response to the domain name service query. Once a temporary packet address is assigned, the gateway controller initiates a data session with the mobile station and routes terminating packets to the mobile station using the temporary packet address.

The dynamic packet address controller includes a memory that stores a first list that establishes correspondences between domain names associated with mobile subscribers via mobile subscriber identifiers, and associated packet addresses. The dynamic packet address controller also stores a second list corresponding to the pool of dynamically-assignable packet addresses, each address having a current status indicator. The dynamic packet address controller assigns as temporary addresses those dynamically-assignable packet addresses in the second electronic list having an "available" current status indicator. Whenever the packet address is allocated or deallocated, the dynamic packet address controller changes the state of the corresponding status indicator in the second list. The first list may store one or more different domain names associated with the mobile subscriber in accordance with the same mobile subscriber identifier but with a different temporary packet address for each of the different domain names. Different domain names may be used for example when the mobile station is running different applications such as e-mail, web browsing, video conferencing, etc.

From the standpoint of the external packet network, no special procedures need to be performed in order to route terminating packets to a mobile station. Standard domain name service protocols which are widely used throughout the Internet are all that is necessary. Thus, simply by detecting the mobile subscriber's domain name, associated protocol data units are directed to the mobile subscriber using the dynamic packet address which is associated by the dynamic packet address controller with a mobile subscriber identifier and a domain name.

BRIEF DESCRIPTION OF THE DRAWINGS

The foregoing and other objects, features, and advantages of the invention will be apparent from the following description of preferred embodiments as illustrated in the accompanying drawings in which reference characters refer to the same parts throughout the various views. The drawings are not necessarily to scale with emphasis being placed upon illustrating the principles of the invention.

FIG. 5 is a table illustrating a relationship between a mobile subscriber (e.g., Internet or domain) name, a mobile subscriber identifier (e.g., IMSI), and an allocated packet address (e.g., PDP address);

FIG. 6 is a table illustrating a relationship between dynamically-assignable packet addresses and an indication of allocation status (allocated/idle);

DETAILED DESCRIPTION OF THE DRAWINGS

In the following description, for purposes of explanation and not limitation, specific details are set forth, such as particular embodiments, hardware, techniques, etc. in order to provide a thorough understanding of the invention. However, it will be apparent to one skilled in the art that the present invention may be practiced in other embodiments that depart from these specific details. For example, while a specific example embodiment of the present invention is described in the context of a GSM/GPRS cellular telephone network, those skilled in the art will appreciate that the present invention can be implemented in any mobile communications system using other mobile data communications architectures and/or protocols. In other instances, detailed descriptions of well-known methods, interfaces, devices, and signaling techniques are omitted so as not to obscure the description of the present invention with unnecessary detail.

Figure 1:
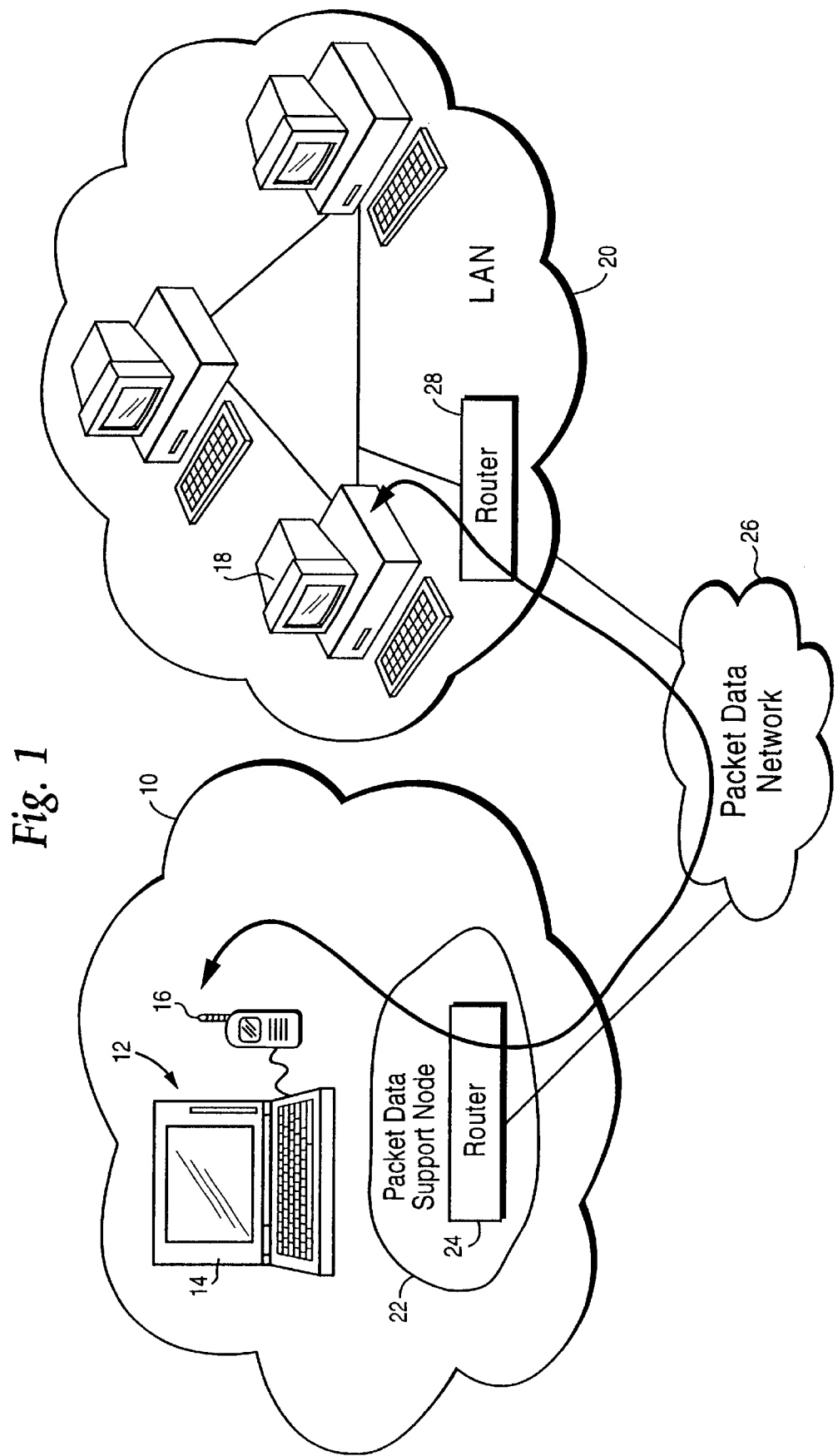
FIG. 1 is a simplified diagram showing a data communication between a mobile host and a fixed host.
Figure 2:
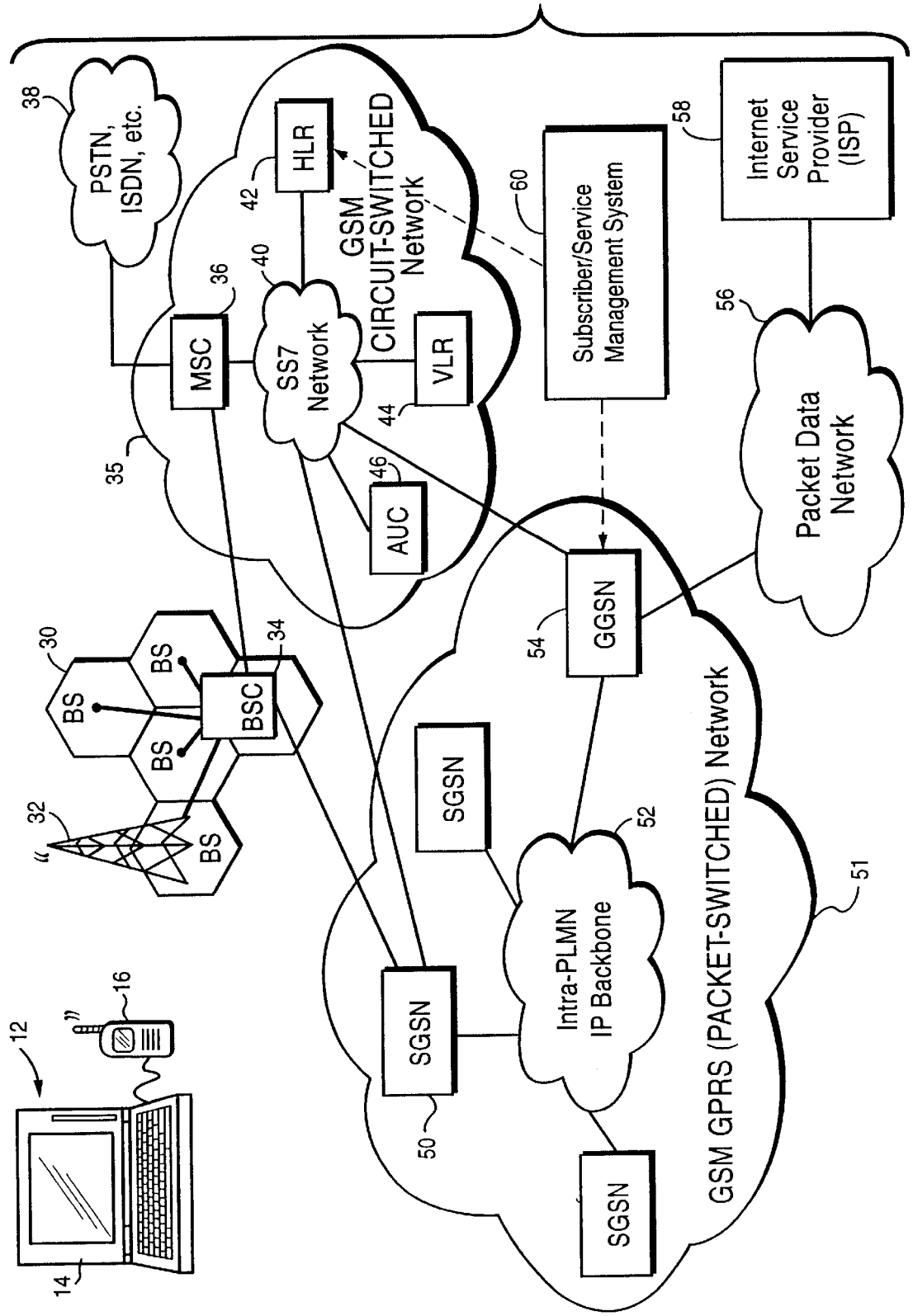
FIG. 2 is a more detailed diagram showing a GSM mobile communications system including a General Packet Radio Service (GPRS) data network.

Accordingly, reference is made throughout the detailed description to the example, non-limiting GSM/GPRS mobile communications network shown in FIG. 2. For purposes of this description, the general term "packet address" refers to any type of address that is employed to route data packets to a particular destination. Examples of packet addresses include Internet Protocol (IP) addresses and Packet Data Protocol (PDP) addresses. Packet addresses are typically a string of numerical digits and are generally not meaningful to users. Instead, users employ names generally recognized by humans. Examples of names include Internet names, e-mail names, domain names, etc.

Figure 3A:
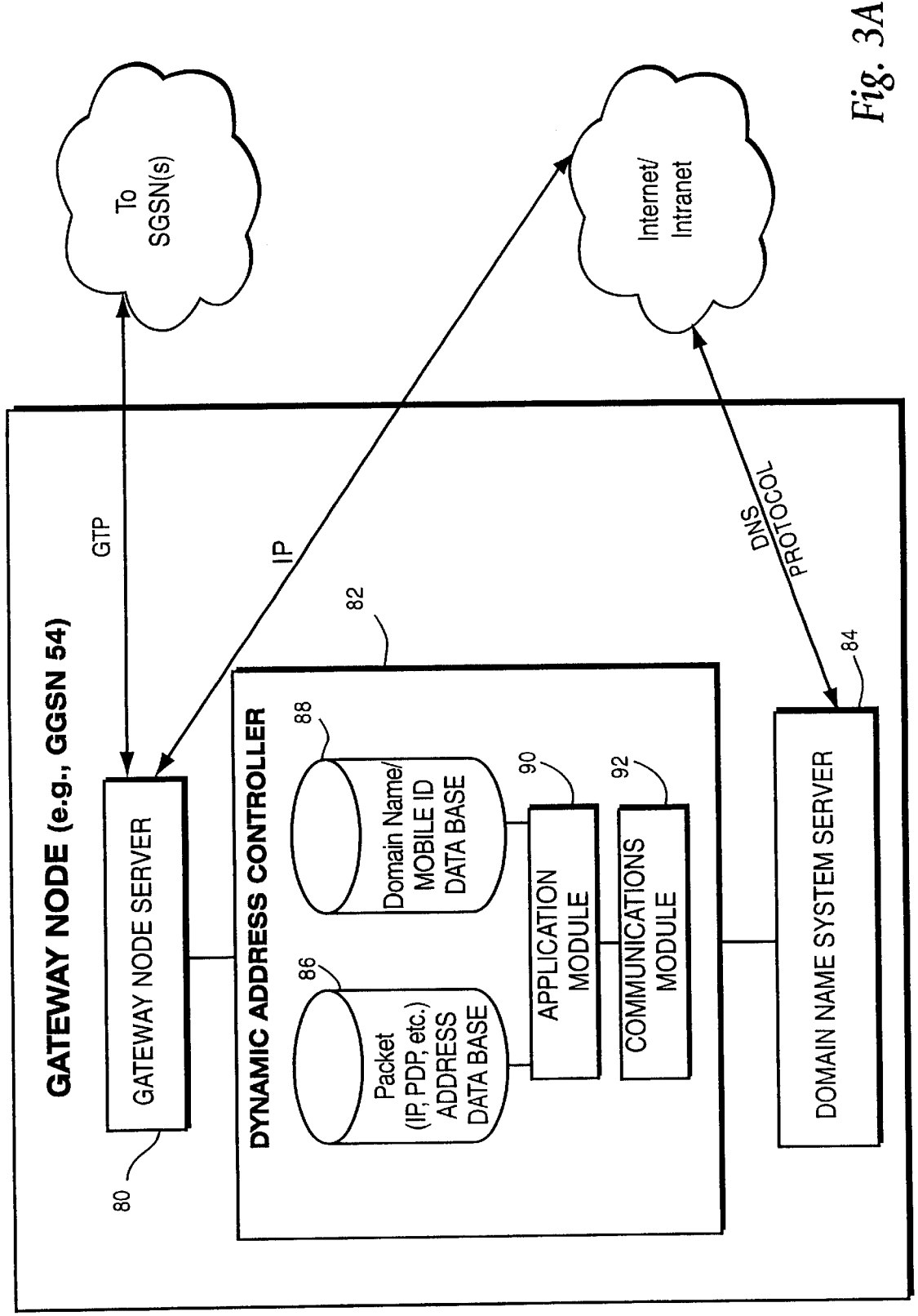
FIG. 3A is a function block diagram illustrating a gateway node of a mobile packet-switched network in a mobile communications system in accordance with one example embodiment of the present invention.
Figure 3B:
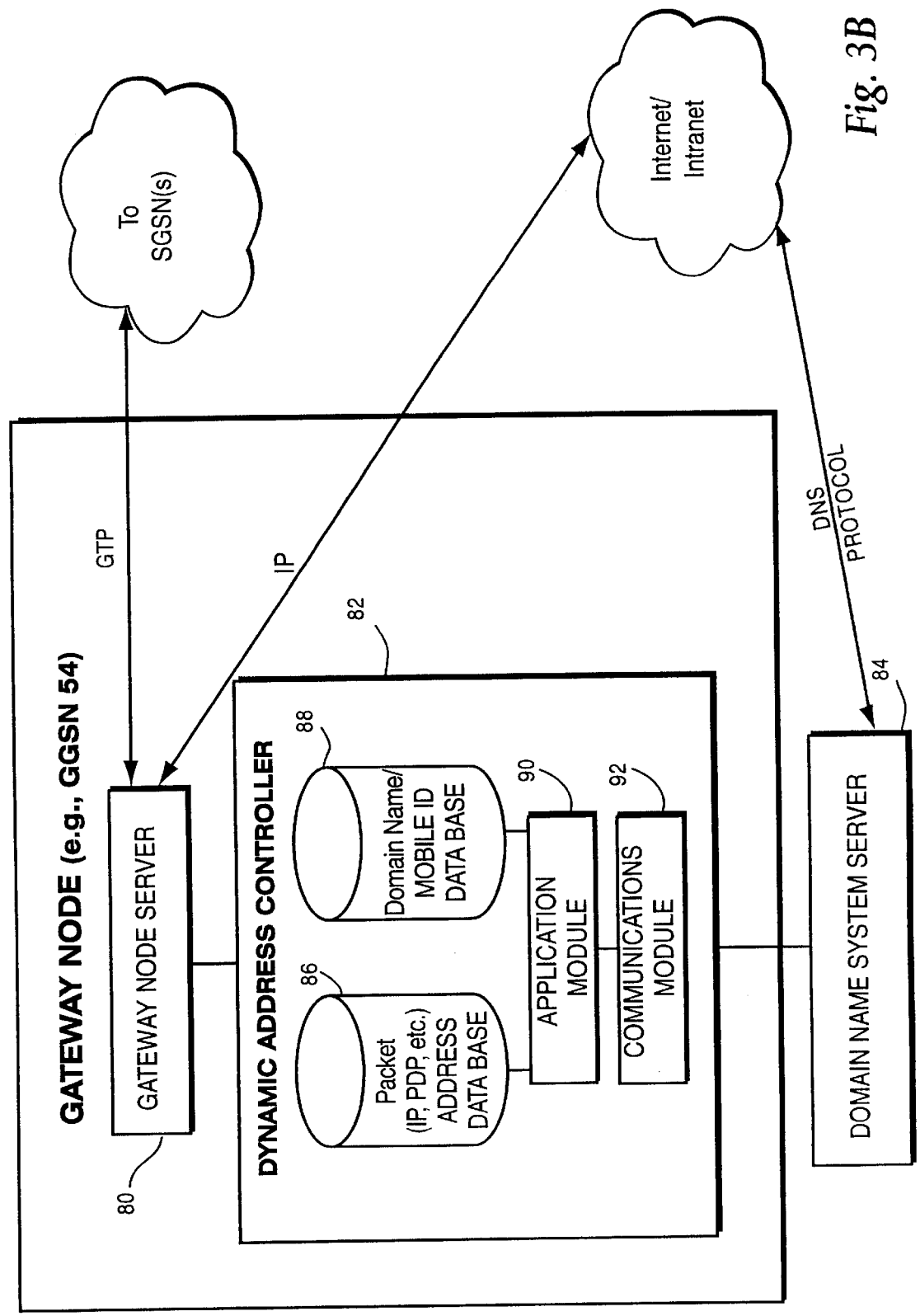
FIG. 3B is a function block diagram illustrating a gateway node of a mobile packet-switched network in a mobile communications system in accordance with a second example embodiment of the present invention.

FIG. 3A shows a first example of a mobile packet-switched network gateway node which in the GSM/GPRS example may be the GGSN node 54 shown in FIG. 2. The GGSN includes a gateway node server 80 which interfaces with the SGSNs 50 via the intra-PLMN IP backbone 52 using a suitable communications protocol such as the GPRS Tunneling Protocol (GTP). The gateway node server 80 also connects to the Internet and/or to an Intranet by way of the packet data network 56 using for example the well-known Internet protocol (IP). In a preferred embodiment, the gateway node server 80 is also connected to a dynamic address controller 82 which includes a packet address database 86 and domain name/ID database 88. Although shown as separate databases, those skilled in the art will recognize that the database information can be stored in one database using a variety of different data structures one of which is described in more detail below. The packet address database 86 and the mobile name/ID database 88 are coupled to an application software module 90 and a communications software module 92. The application module 90 controls access and retrieval of information from the two databases 86 and 88. The communications module 92 oversees communication between the dynamic address controller 82 and the domain name server 84. The domain name system server 84 may be co-located with the gateway node 54 as shown in FIG. 3A, located as a stand-alone node as shown in FIG. 3B, or located in another node. Those skilled in the art will also appreciate that the dynamic address controller 82, although preferably co-located in the gateway node, may also be a stand-alone node or co-located in another node.

In general, the domain name/mobile ID database 88 establishes a correspondence between a name associated with the mobile subscriber (e.g., a human recognizable name such as an Internet domain name), and a mobile subscriber identifier (e.g., such as an International Mobile Subscriber Identifier (IMSI)). In addition, a packet data address is associated with each mobile subscriber name and identifier. The packet address database 86 stores a list of all usable packet data addresses along with a corresponding status indicator of available or not available. If the packet address is allocated via application module 90 to a particular mobile name/identifier, the application module 90 changes its status indicator to allocated." When the address is no longer needed and returned to the pool of packet addresses, the application module changes the corresponding status indicator to "idle" or "available."

Figure 4:
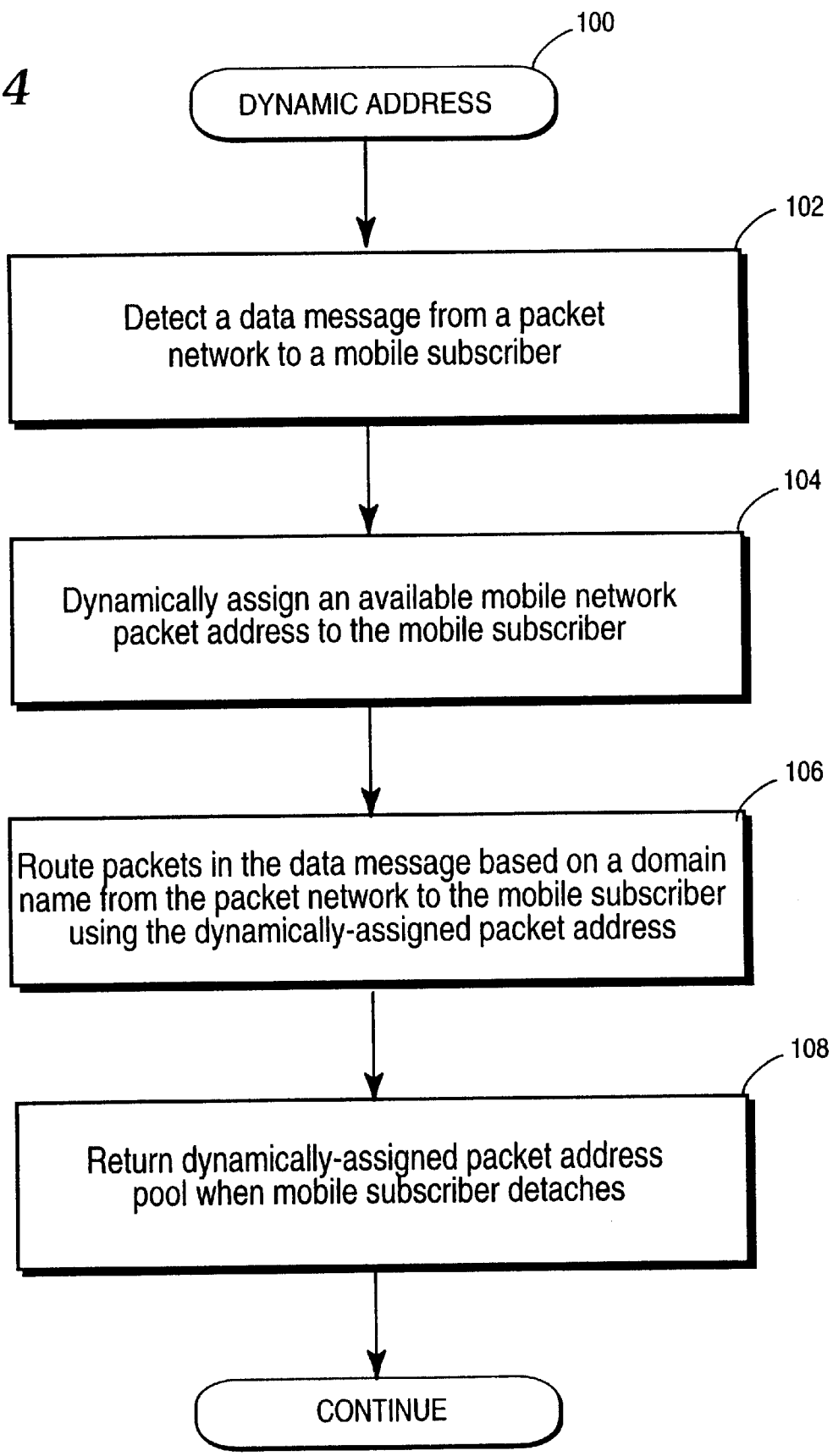
FIG. 4 is a flowchart diagram illustrating a set of dynamic address procedures in accordance with an example embodiment of the present invention.

FIG. 4 is a flowchart diagram illustrating general dynamic address allocation procedures (block 100). Initially, a data message is detected from the packet data network intended for a mobile subscriber in the mobile communications network (block 102). An available mobile network packet address is dynamically assigned to that mobile subscriber from a pool of dynamically-assignable packet addresses (block 104). Thereafter, the "mobile-terminating" packets in the data message are routed to the mobile subscriber based on a domain name corresponding to the mobile subscriber associated with the data message. Accordingly, the originator of the message need only know the domain name of the mobile subscriber and does not need to know a specific packet address. The correspondence established between the mobile subscriber domain name and the dynamically-assigned packet address at the mobile network gateway node is used to provide the packet address needed to route packets to the mobile subscriber (block 106). When the data communication is ended or the packet address is no longer necessary, the dynamically-assigned packet address is returned to the address pool when the mobile station detaches from the mobile data network (block 108).

A specific data structure for the databases 88 and 86 are now described in conjunction with the illustrations provided in FIGS. 5 and 6, respectively. The data structure in the database 88 in FIG. 5 includes three columns corresponding to a mobile destination name, an IMSI, and any allocated PDP address. A "static relationship" is established between each destination name and mobile IMSI. However, the static relationship between a mobile destination name and its IMSI may have a static or dynamic relationship with respect to a particular packet address (e.g., a PDP address). For a static relationship, a single PDP address is dedicated to a particular destination name. For a dynamic relationship, any available/idle PDP address from the PDP address pool may be dynamically assigned to a mobile destination name/IMSI pair.

Each mobile destination name and each PDP address are uniquely defined in the table. On the other hand, and as shown in FIG. 5, the same IMSI may be specified in more than one row. This permits a mobile subscriber to have more than one PDP context, and each PDP context is defined using a different destination name and PDP address but allocated to the same IMSI.

The table shown in FIG. 6 stores all of the dynamic PDP addresses maintained by the mobile network operator. Each address has an allocation indication as either allocated or idle. The dynamic PDP addresses are assigned to specific destination names when the incoming request is received and returned when the mobile subscriber detaches.

Figure 7:
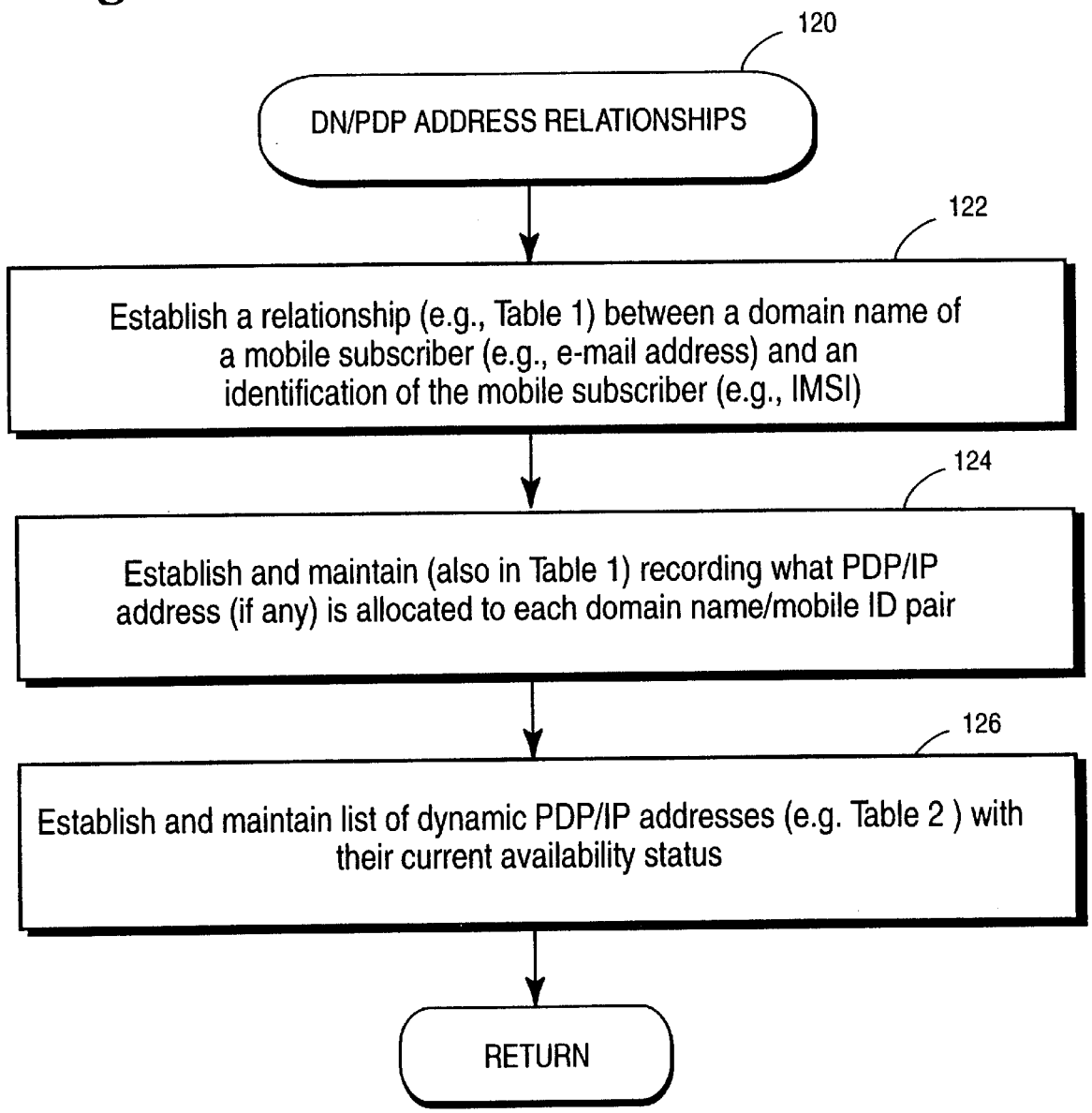
FIG. 7 is a flowchart diagram illustrating example procedures for establishing relationships between mobile subscriber names and packet addresses.

Reference is now made to the flowchart in FIG. 7 which outlines a Domain Name/PDP Address Relationships routine (block 120) in flowchart form. A relationship is established (for example in the form of a Table 1) between a domain name of a mobile subscriber and an identification or identifier of the mobile subscriber such as the IMSI (block 122). Another relationship is established and maintained (preferably also in Table 1) to record what PDP address (if any) is allocated to each domain name/mobile ID pair (block 124). A second list is established and maintained of all dynamic PDP/IP addresses (e.g., in the form of a second Table 2) with an indication of the current availability of each address.

Figure 8:
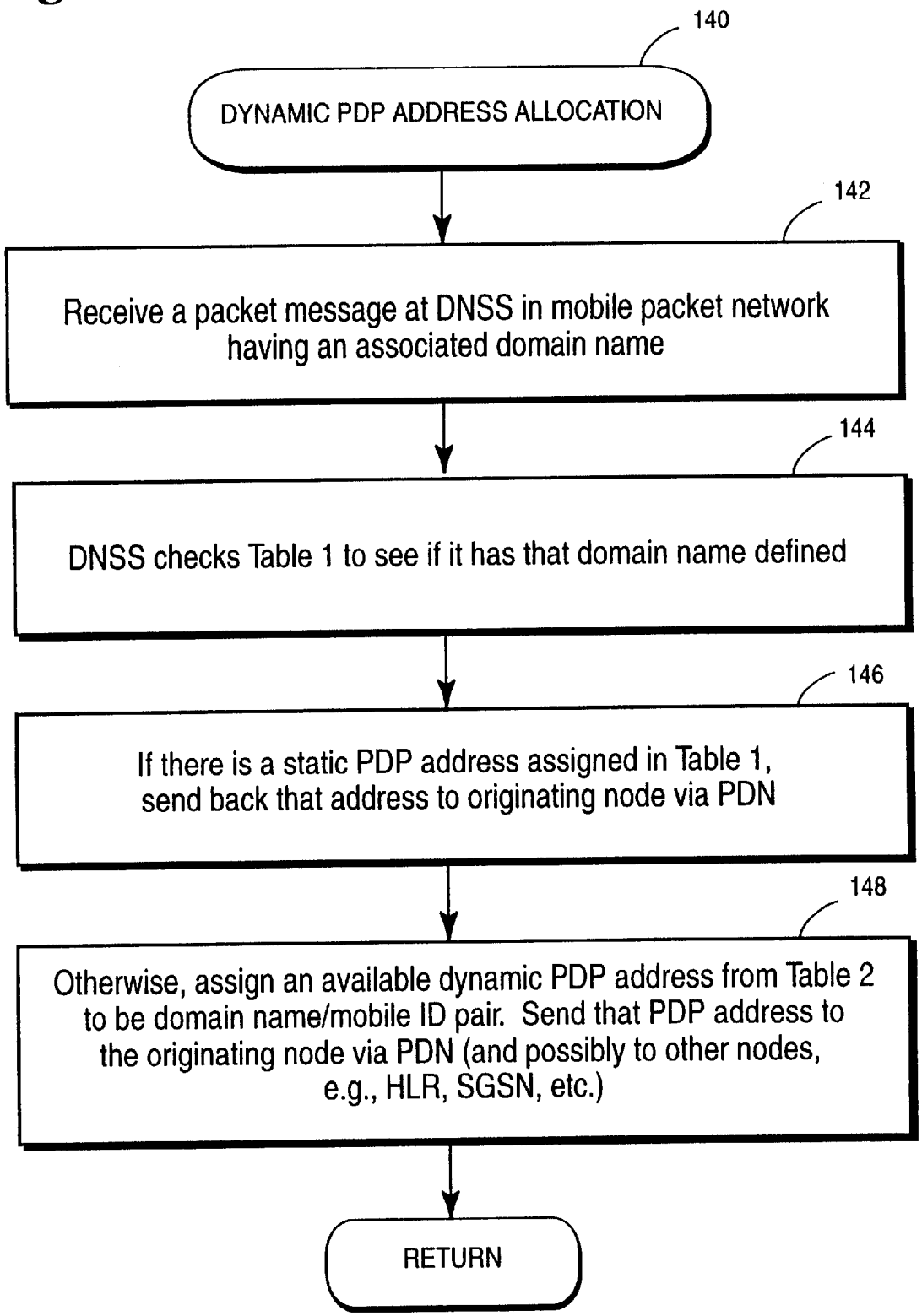
FIG. 8 is a flowchart diagram illustrating example procedures for dynamically allocating addresses from the relationships established in FIG. 7.

FIG. 8 illustrates a Dynamic PDP Address allocation routine (block 140). A packet message is received at the domain name system server in the mobile packet network having an associated domain name (block 142). The domain name system server checks Table 1 to determine if that domain name is defined in Table 1 (block 144). If there is a static PDP address assigned in Table 1 for that domain name, that static PDP address is sent back to the message originating party via the packet data network (block 146). Otherwise, an available, dynamic PDP address is assigned from Table 2 (based on the allocation indication) to the domain/mobile ID pair. That dynamically assigned PDP address is sent to the originating node via the packet data network and to other nodes including the HLR, the SGSN, etc. (block 148). The HLR, for example, stores an indication of whether static or dynamic addressing is used in this PDP context for the mobile.

Figure 9:
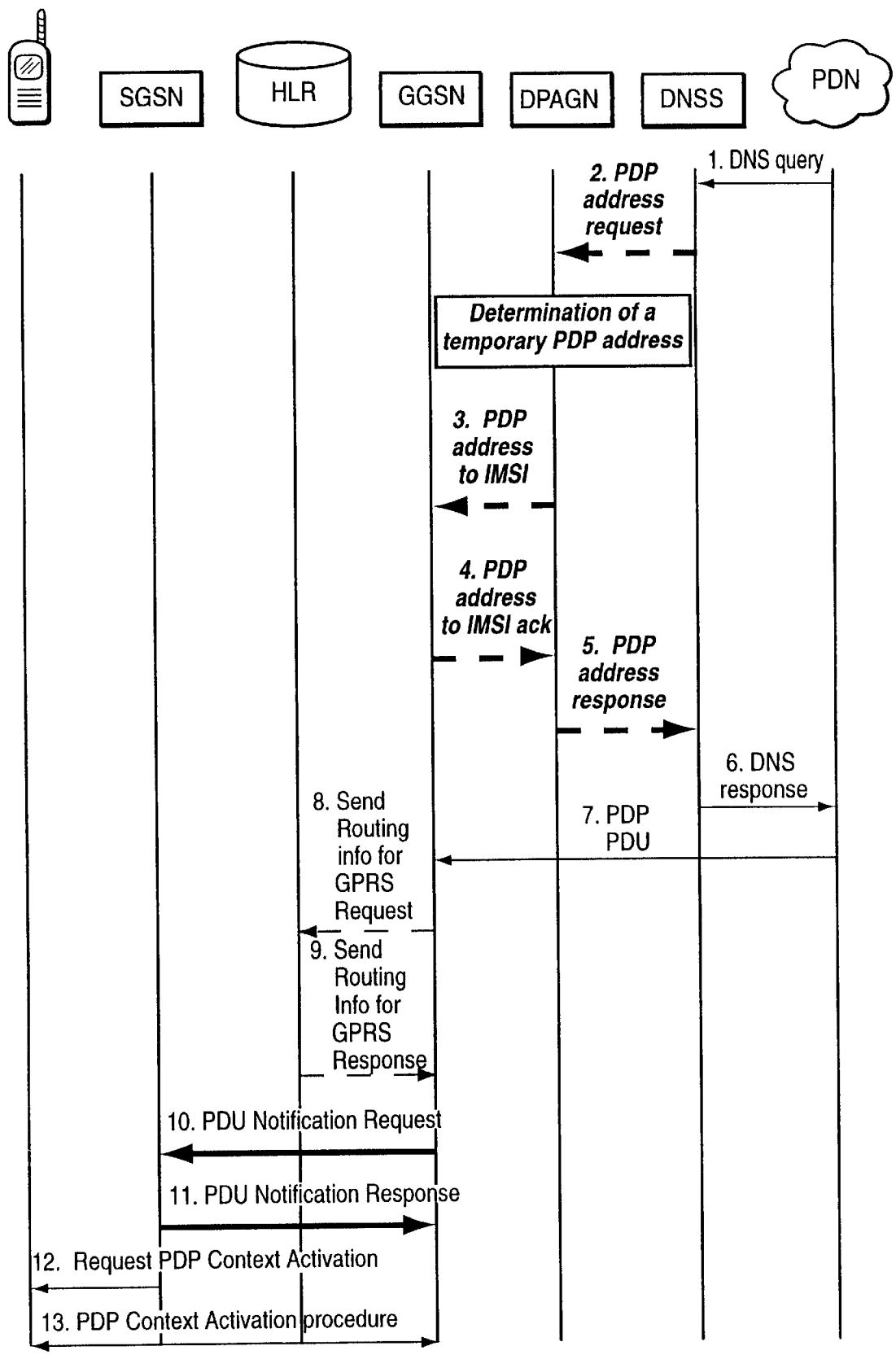
FIG. 9 is a signaling flow diagram for an example implementation of the present invention in the context of a GSM/GPRS mobile communications system illustrating example signals employed to effect a mobile terminating data communication in which a packet address is temporarily allocated to a mobile subscriber in order to communicate the terminating packets to the mobile subscriber.

FIG. 9 outlines example signals between various nodes in a GSM/GPRS-based network incorporating an example implementation of the present invention. A packet message from an originating node routed through a packet data network (PDN) presents a domain name system server query to the domain name system server (DNS) 84. Upon reception of the DNS query, the domain name system server 84 interrogates the dynamic address controller 82 via communications module 92 and supplies a specific domain name. More specifically, a signal entitled PDP address request is sent from the domain name system server 84 to the dynamic address controller 82 providing the mobile subscriber's domain name. Upon receiving the request, the dynamic address controller application module 90 obtains an available/idle PDP address from the packet address database 86, changes that address' status from available/idle to allocated, and stores that dynamically allocated packet address in association with the mobile subscriber domain name and IMSI pair in the domain name/mobile ID database 88. The communications module 92 sends a message to the gateway node server 80 for the purposes of updating the GPRS subscription with a new PDP address associated with the mobile's IMSI. The GGSN stores this information (i.e., the IMSI and dynamic PDP address) upon receipt of message "3" in FIG. 9. This dynamically-established relationship terminates when the PDP context is deleted by the SGSN (see FIG. 10).

Upon a successful update of the GPRS subscriber data in the GGSN, the gateway node server 80 acknowledges the successful modification to the dynamic address controller 82 which then sends back to the domain name system server 84 the domain name along with the dynamically allocated PDP address in the form of a PDP address response message. The domain name system server 84 provides the temporarily allocated PDP address to the requesting entity by way of a domain name system server response message. The time-to-live (TTL) field in the DNS response message is set to zero because the allocation of the dynamic address changes at every new allocation.

Once the mobile subscriber is assigned a temporary PDP address, data packets/PDUs from the originating entity are forwarded from the packet data network to the GGSN. The GGSN sends a GPRS request for routing information to the HLR and receives from the HLR the appropriate routing information including, for example, the appropriate SGSN, base station controller, and base station where the mobile station is currently registered/located. With that routing information, the GGSN provides a PDU notification request to the identified SGSN which acknowledges that request with a PDU notification response. The SGSN also requests a PDP context activation with the mobile subscriber (via the BSC and base station which are not shown). Standard PDP context activation procedures continue after this point, for example, as defined in the Digital Cellular Telecommunications System Specification (Phase II+) General Packet Radio Service (GPRS) Service Description Stage 2 GSM 03.60.

Figure 10:
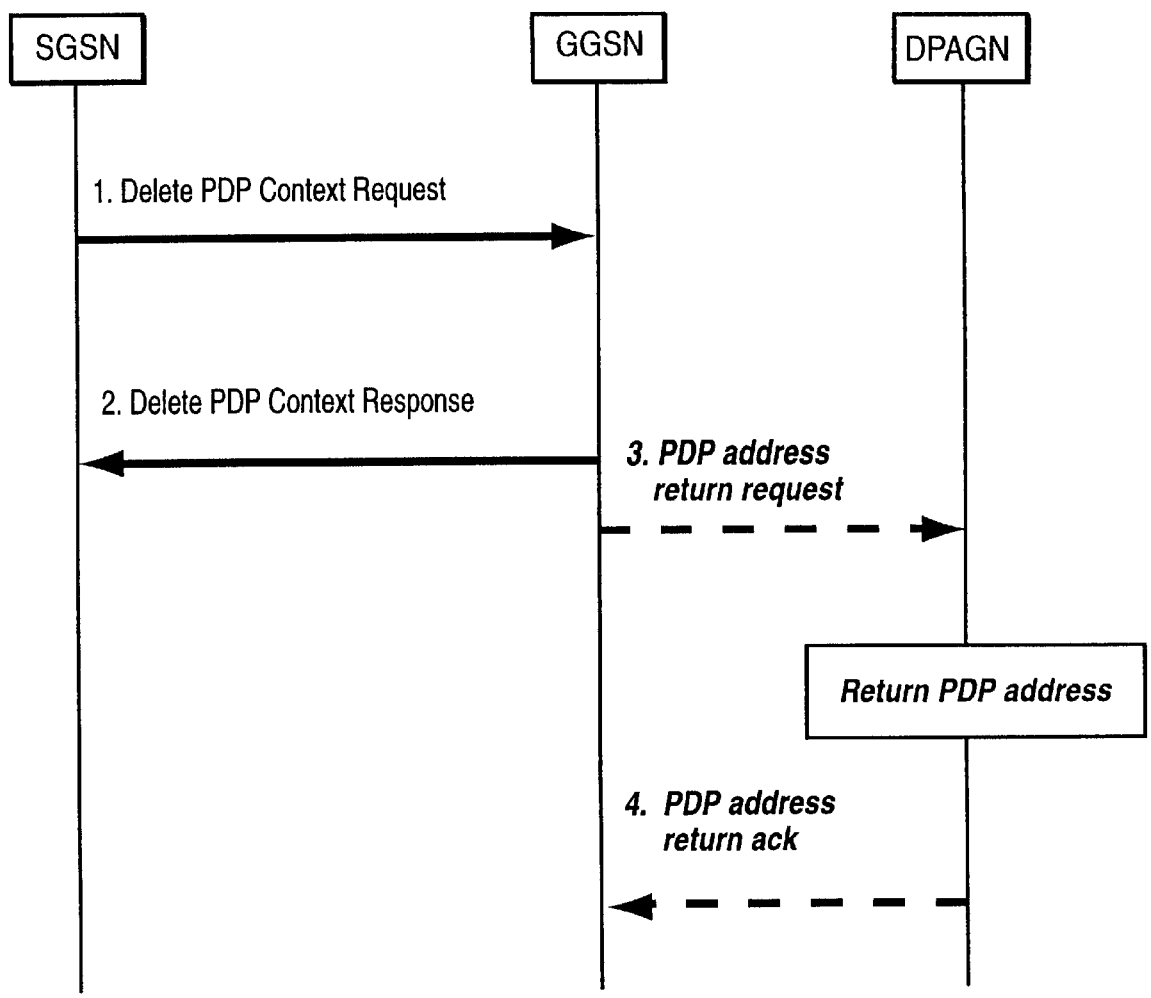
FIG. 10 is a signaling flow diagram in the context of a GSM/GPRS mobile communications system showing example procedures in which a previously allocated packet address is returned to the pool of dynamically-assignable packet addresses.

When allocated PDP addresses are no longer needed, they are returned to the dynamic packet address pool in the packet address database 86 by changing the status indicator from allocated to available/idle and removing that allocated PDP dynamic address from the domain name/mobile ID database 88. FIG. 10 shows a signaling flow between various nodes in the GSM/GPRS example implementation of this packet address return procedure. When a mobile subscriber detaches or is about to detach from the GPRS network, the SGSN sends a delete PDP context request message to the GGSN which acknowledges that response and sends a PDP address return request message to the dynamic address controller 82. The dynamic address controller 82 then "returns" the PDP address, changes its status allocation from allocated to available/idle, removes that allocated PDP dynamic address from the domain name/mobile ID database 88, and sends a PDP address return acknowledgment message back to the GGSN.

In a situation where all of the dynamic addresses in the packet address database 86 are allocated, the dynamic address controller 82 sends a PDP address response message to the domain name system server 84 with an empty field for the PDP address. As a result, the domain name system server 84 does not send any DNS response message back to the packet data network. Similarly, if the GGSN controller 80 fails to provide a PDP address to IMSI acknowledgment message back to the dynamic address controller 82, the dynamic address controller 82 resets the status of the just-allocated packet address to available/idle and sends a PDP address response message to the domain name system server 84 having an empty field for the PDP address. The domain name system server 84 would therefore not send any DNS response message to the packet data network. In returning PDP addresses in FIG. 10, if the dynamic address controller 82 fails to send a response to the PDP address return request, the GGSN reinitiates this operation until there is a successful acknowledgment to avoid adversely impacting availability of the dynamic PDP addresses.

Thus the present invention provides a relatively simple and efficient method to route incoming PDUs in a mobile packet data network based on the domain name system server type names, and specifically, by dynamically providing temporary addresses to mobile subscriber domain names. The domain name system server 84 employs a database to associate domain name with a unique mobile identifier and a temporarily-allocated PDP address. As a result, a pool of packet addresses may be defined by the mobile network operator and shared by many subscribers without having to specifically dedicate those PDP addresses to specific mobiles. Moreover, entities that desire to send packet messages to mobile subscribers need not adopt any special procedures or protocols but simply use the mobile subscriber's domain name and standard domain name system server procedures. In fact, the originating entity does not need to know that it is sending information to a mobile subscriber.

While the present invention has been described with respect to particular embodiments, those skilled in the art will recognize that the present invention is not limited to the specific embodiments described and illustrated herein. Different formats, embodiments, and adaptations besides those shown and described, as well as many variations, modifications, and equivalent arrangements may also be used to implement the invention. For example, other packet-switched networks or naming systems might be used. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed:

1. A method for communicating data from a packet data network station to a mobile communication station by way of a mobile communications network that includes a base station for radio communication with the mobile station, comprising:

receiving at the mobile communications network a message from the packet network intended for the mobile station;

the packet data network requesting assignment of a mobile communications network packet address for the mobile station;

in response to the request from the packet data network, dynamically assigning an available mobile communications network packet address to the mobile station; and routing packets in the data message to the mobile station using the dynamically-assigned packet address.

2. The method in claim 1, further comprising:

establishing a list of dynamically-assigned packet addresses, each dynamically-assigned packet address having a corresponding indication in the list designating whether the dynamically-assigned packet address is allocated or available for allocation.

3. The method in claim 2, further comprising:

when a packet address from the list is allocated to the mobile subscriber, changing its corresponding indication from available to allocated, and when a the dynamically-assigned packet address is returned, changing its corresponding indication in the list from allocated to available.

4. A method for communicating data from a packet data network to a mobile station associated with a mobile subscriber by way of a mobile communications network that includes a base station for radio communication with the mobile station, comprising:

electronically establishing a correspondence between a mobile subscriber name associated with the mobile subscriber and an international mobile subscriber identifier (IMSI);

electronically associating a packet data address with the corresponding mobile subscriber name and IMSI; and directing packets from the packet data network to the mobile station using the packet address associated with the corresponding mobile subscriber name and IMSI.

5. The method in claim 4, wherein the mobile subscriber name is an Internet domain name.

6. The method in claim 4, further comprising:

the packet data network requesting association of a packet data address with the corresponding mobile subscriber name and IMSI.

7. The method in claim 4, further comprising:

storing a first electronic list of plural correspondences between a mobile subscription associated with the IMSI and one or more associated domain names each associated with a packet data address.

8. The method in claim 7, further comprising:

storing in the first electronic list two different names associated with the mobile station in correspondence with the IMSI, and storing in the first electronic list a different temporary packet address associated with each of the two different names.

9. The method in claim 8, further comprising:

storing a second electronic list packet data addresses and corresponding status indicators, changing a state of status indicators when a corresponding packet data addresses is allocated or de-allocated.

10. The method in claim 9, further comprising:

detecting a message from the packet data network intended for the mobile subscriber;

assigning an available packet address from the second electronic list to the mobile subscriber;

storing the assigned packet address from the second electronic list in the first electronic list in association with the mobile subscriber name and the LMSI.

11. The method in claim 4, further comprising:

determining whether the associated packet address is a static address assigned to only one mobile subscriber or a dynamic address that may be assigned to different mobile subscribers at different times.

12. A method for communicating data from a packet data network to a mobile station by way of a mobile communications network that includes a base station for radio communication with the mobile station, comprising:

receiving at the mobile communications network a domain name service query associated with the mobile station from the packet data network;

in response to the domain name service query from the packet data network, requesting a packet address for the mobile station;

selecting from a pool of packet addresses a packet address to be temporarily associated with the mobile subscriber; and providing, as a response to the domain name service query from the packet data network, the temporary packet address to permit a packet communication to be directed to the mobile subscriber.

13. The method in claim 12, wherein the mobile communications network includes a gateway node interfacing a packet data network, the method further comprising:

routing data packet information that includes the temporary packet address received at the gateway node to the mobile station.

14. The method in claim 12, further comprising:

receiving an indication that the mobile subscriber no longer needs the temporary packet address, and indicating that the temporary packet address is available for allocation to another mobile subscriber.

15. The method in claim 12, further comprising:

storing a correspondence between a domain name associated with the mobile subscriber included in the domain name service query and a mobile subscriber identifier, and storing the temporary packet address with the corresponding mobile subscriber domain name and identifier.

16. The method in claim 15, further comprising:

storing one or more different domain names associated with the mobile subscriber in correspondence with the mobile station identifier, and storing a different temporary packet address for each of the different domain names.

17. The method in claim 12, further comprising:

detecting in the mobile communications network a mobile subscriber domain name associated with one or more protocol data units (PDUs) provided from the external packet data network to be received at the mobile subscriber, and directing the PDUs to the mobile subscriber using the detected mobile subscriber domain name.

18. The method in claim 17, further comprising:

assigning a temporary packet address to the mobile subscriber's domain name, wherein the PDUs are directed to the mobile subscriber using the detected domain name and the assigned temporary address.

19. The method in claim 17, further comprising:

using an international mobile subscriber identifier (IMSI) to associate the PDUs with the mobile subscriber.

20. In a cellular telecommunications system including a base station for conducting radio communications with a mobile station and a gateway service node including a gateway controller coupled to the base station and an external packet data network, a mobile radio packet-switched network, comprising:

a domain name server, associated with the gateway service node, for receiving a domain name service query from the external packet data network, and a dynamic packet address controller for receiving a request for a packet address from the domain name server, assigning a temporary packet address to the mobile station, and providing the temporary packet address to the domain name server, wherein the domain name server returns the temporary packet address to the external packet data network in response to the domain name service query.

21. The mobile radio packet-switched network in claim 20, wherein the domain name server is located in the gateway node.

22. The mobile radio packet-switched network in claim 20, wherein the domain name server is located outside of the gateway node.

23. The mobile radio packet-switched network in claim 20, wherein the dynamic packet address controller is located in the gateway node.

24. The mobile radio packet-switched network in claim 20, wherein the dynamic packet address controller includes a memory for storing a first list establishing a correspondence between a domain name associated with the mobile subscriber, a mobile subscriber identifier, and a packet address.

25. The mobile radio packet-switched network in claim 23, wherein the dynamic packet address controller stores a second list of dynamically-assignable packet data addresses each having a current status indicator, the dynamic packet address controller being configured to assign as the temporary address one of the dynamically-assignable packet data addresses in the second electronic list having a current status indicator of available.

26. The mobile radio packet-switched network in claim 25, wherein when its corresponding packet data address is allocated or de-allocated, the dynamic packet address controller is configured to change the state of a corresponding status indicator in the second list.

27. The mobile radio packet-switched network in claim 24, wherein the first list stores one or more different domain names associated with the mobile station in correspondence with the mobile subscriber identifier and a different temporary packet address for each of the different domain names.

28. The mobile radio packet-switched network in claim 24, wherein the mobile identifier is an international mobile subscriber identifier (IMSI).

29. The mobile radio packet-switched network in claim 20, wherein the mobile radio packet-switched network is coupled to a service supporting node, which is coupled to the base station, for directing packets with the temporary packet address from the gateway service node to the base station.

30. The mobile radio packet-switched network in claim 20, wherein when the mobile subscriber no longer needs the temporary packet address, the dynamic packet address controller is configured to make the temporary address available for temporary allocation to another mobile subscriber.

31. The mobile radio packet-switched network in claim 20, wherein after the mobile subscriber is assigned the temporary address, the gateway controller is configured to direct protocol data units (PDUs) received from the packet data network that include the temporary packet address towards the mobile subscriber.

32. The mobile radio packet-switched network in claim 31, wherein the gateway controller initiates a data session with the mobile station using the temporary address.

* * * * *